United States Patent
Shibayama et al.

(10) Patent No.: US 9,966,979 B2
(45) Date of Patent: May 8, 2018

(54) TRANSMISSION CIRCUIT, RECEPTION CIRCUIT AND COMMUNICATION SYSTEM

(71) Applicant: Kabushiki Kaisha Toshiba, Minato-Ku, Tokyo (JP)

(72) Inventors: Hiroyuki Shibayama, Kawasaki Kanagawa (JP); Shinsuke Fujii, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 14/845,141

(22) Filed: Sep. 3, 2015

(65) Prior Publication Data
US 2016/0218770 A1    Jul. 28, 2016

(30) Foreign Application Priority Data

Jan. 28, 2015   (JP) ................................. 2015-014686

(51) Int. Cl.
H04B 1/04        (2006.01)
H04B 3/54        (2006.01)

(52) U.S. Cl.
CPC ................. H04B 1/04 (2013.01); H04B 3/54 (2013.01); *H04B 2203/5483* (2013.01)

(58) Field of Classification Search
CPC ........... H01F 38/14; H02J 7/025; H02J 17/00; H04B 1/04; H04B 1/12; H04B 1/123; H04B 1/16; H04B 1/7073; H04B 3/54; H04B 3/544; H04B 5/00; H04B 10/00;

(Continued)

(56) References Cited

U.S. PATENT DOCUMENTS

| | | |
|---|---|---|
| 5,559,462 A | 9/1996 | Tanoi |
| 6,778,783 B2 | 8/2004 | Okayasu et al. |
| 8,112,002 B2 | 2/2012 | Uemura et al. |

(Continued)

FOREIGN PATENT DOCUMENTS

| | | |
|---|---|---|
| JP | H07-107122 A | 4/1995 |
| JP | 3632031 B2 | 3/2005 |

(Continued)

OTHER PUBLICATIONS

Taiwanese Office Action dated Oct. 14, 2016 in counterpart Taiwanese patent Application No. 104128820, long with English translation thereof.

*Primary Examiner* — Shawkat M Ali
(74) *Attorney, Agent, or Firm* — White & Case LLP

(57) ABSTRACT

According to an embodiment, a transmission circuit is configured to transmit a signal to a reception circuit through a transmitting AC coupling element. The reception circuit receives a signal through a receiving AC coupling element. The transmitting AC coupling element is AC coupled to the receiving AC coupling element. The transmission circuit includes a drive signal generation circuit and a drive circuit. The drive signal generation circuit is configured to generate a drive signal in synchronization with a transmission signal to be transmitted. The drive circuit is configured to cause, in response to the drive signal, a drive current to flow through the transmitting AC coupling element in synchronization with a rising edge and a falling edge of the transmission signal during a driving period set in advance.

7 Claims, 9 Drawing Sheets

(58) Field of Classification Search
CPC ......... H04B 10/04; H04L 25/34; H04L 27/00; H04L 275/01
USPC ......... 307/104; 320/107, 149; 327/201, 590; 375/232, 259, 289, 295; 714/799
See application file for complete search history.

(56) References Cited

U.S. PATENT DOCUMENTS

| | | | |
|---|---|---|---|
| 8,913,687 B1* | 12/2014 | Huang | H04B 5/0031 375/295 |
| 2002/0008892 A1 | 1/2002 | Okayasu et al. | |
| 2012/0081177 A1* | 4/2012 | Nuebling | H04B 3/56 327/590 |
| 2012/0257463 A1 | 10/2012 | Jain et al. | |
| 2013/0055052 A1* | 2/2013 | Kaeriyama | H01L 25/162 714/799 |
| 2013/0285465 A1* | 10/2013 | Takeda | H01F 38/14 307/104 |
| 2013/0285467 A1* | 10/2013 | Takahashi | H01F 38/14 307/104 |
| 2014/0072025 A1* | 3/2014 | Matsudaira | H04L 27/01 375/232 |
| 2014/0375251 A1* | 12/2014 | Sakai | H02J 17/00 320/107 |

FOREIGN PATENT DOCUMENTS

| | | |
|---|---|---|
| JP | 2005-348264 A | 12/2005 |
| JP | 2010-136244 A | 6/2010 |
| WO | 98/32247 A1 | 7/1998 |

* cited by examiner

FIG. 3 (COMPARATIVE EXAMPLE)

TRANSMISSION CIRCUIT, RECEPTION CIRCUIT AND COMMUNICATION SYSTEM

CROSS REFERENCE TO RELATED APPLICATION

This application is based upon and claims the benefit of priority from the prior Japanese Patent Application No. 2015-014686 filed on Jan. 28, 2015 in Japan, the entire contents of which are incorporated herein by reference.

FIELD

Embodiments described herein relate generally to a transmission circuit, a reception circuit and a communication system.

BACKGROUND

A communication system including a transmission circuit, which transmits a signal through a transmission inductor, and a reception circuit, which receives a signal through a reception inductor inductively coupled to the transmission inductor, is known. The reception circuit restores, from the received signal, a transmitted original data pattern.

In this communication system, it is preferable to reduce the power consumption of the transmission circuit.

DETAILED DESCRIPTION

According to an embodiment, a transmission circuit is configured to transmit a signal to a reception circuit through a transmitting AC coupling element. The reception circuit receives a signal through a receiving AC coupling element. The transmitting AC coupling element is AC coupled to the receiving AC coupling element. The transmission circuit includes a drive signal generation circuit and a drive circuit. The drive signal generation circuit is configured to generate a drive signal in synchronization with a transmission signal to be transmitted. The drive circuit is configured to cause, in response to the drive signal, a drive current to flow through the transmitting AC coupling element in synchronization with a rising edge and a falling edge of the transmission signal during a driving period set in advance.

Embodiments will now be explained with reference to the accompanying drawings.

First Embodiment

Figure 1:
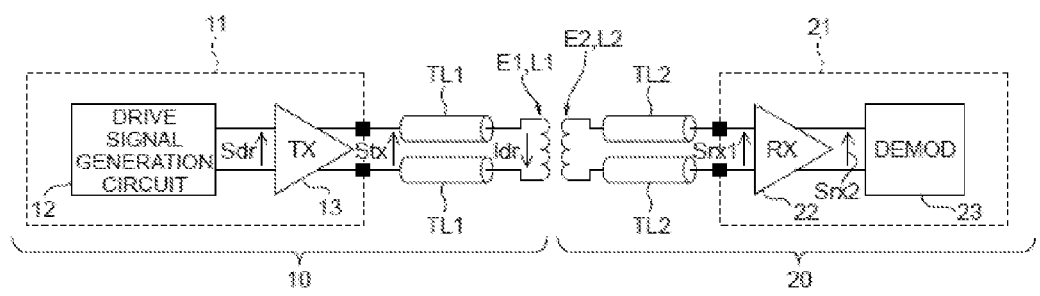
FIG. 1 is a block diagram illustrating a schematic configuration of a communication system according to a first embodiment.

FIG. 1 is a block diagram illustrating a schematic configuration of a communication system according to a first embodiment. As illustrated in FIG. 1, a communication system 1 includes a transmitter 10 and a receiver 20. The transmitter 10 and the receiver 20 perform contactless communication using AC coupling. Here, an example in which inductive coupling is used as the AC coupling will be described.

The transmitter 10 includes a transmitting AC coupling element E1, a pair of first transmission lines TL1 and TL1, and a transmission circuit 11. The transmitting AC coupling element E1 is a transmission inductor L1. The transmission inductor L1, and the first transmission lines TL1 and TL1, and the transmission circuit 11 are provided, for example, on a printed wiring board of the transmitter 10. The transmission inductor L1 is, for example, a planar inductor.

The first transmission lines TL1 and TL1 are, for example, a microstrip line or the like and connect the transmission circuit 11 and both ends of the transmission inductor L1.

The transmission circuit 11 transmits, to a reception circuit 21 of the receiver 20, a differential signal in response to a transmission signal Stx to be transmitted, through the first transmission lines TL1 and TL1 and the transmission inductor L1. Hereinafter, the differential signal will be described, and the signal may be a single phase (single end) signal.

The transmission circuit 11 includes a drive signal generation circuit 12 and a drive circuit 13. The drive signal generation circuit 12 generates a drive signal Sdr in synchronization with the transmission signal Stx to be transmitted. The transmission signal Stx is modulated by a predetermined modulation method. The transmission signal Stx may be supplied from outside to the drive signal generation circuit 12, or may be generated inside the drive signal generation circuit 12 which functions as a modulator.

The drive circuit 13 causes, in response to the drive signal Sdr, a drive current Idr to flow through the transmission inductor L1 in synchronization with a rising edge and a falling edge of the transmission signal Stx during a driving period Tdr set in advance.

The receiver 20 includes a receiving AC coupling element E2, a pair of second transmission lines TL2 and TL2, and the reception circuit 21. The receiving AC coupling element E2 is a reception inductor L2. The reception inductor L2, the second transmission lines TL2 and TL2, and the reception circuit 21 are provided, for example, on a printed wiring board of the receiver 20. The reception inductor L2 is, for example, a planar inductor.

The transmitter 10 and the receiver 20 are adjacently arranged so that the transmission inductor L1 is adjacent to the reception inductor L2 when the communication is performed. The distance between the transmission inductor L1 and the reception inductor L2 is, for example, several hundreds μm. With this arrangement, the reception inductor L2 is inductively coupled (AC coupled) to the transmission inductor L1. Thus, the signal is transmitted from the transmission inductor L1 to the reception inductor L2 by electromagnetic induction.

The second transmission lines TL2 and TL2 are, for example, a microstrip line or the like and connect both ends of the reception inductor L2 and the reception circuit 21.

The reception circuit 21 receives, through the reception inductor L2 and the second transmission lines TL2 and TL2, a differential first reception signal Srx1 in response to the transmitted signal.

The reception circuit 21 includes a hysteresis circuit (hysteresis buffer) 22 and a demodulator 23. The hysteresis circuit 22 has a hysteresis in input/output characteristics and outputs a second reception signal Srx2 in response to the first reception signal Srx1. More specifically, the hysteresis circuit 22 outputs the high level ("H") second reception signal Srx2 when the first reception signal Srx1 has changed to a positive first threshold voltage or higher, and outputs the low level ("L") second reception signal Srx2 when the first reception signal Srx1 has changed to a negative second threshold voltage or lower.

The demodulator 23 demodulates, by a method corresponding to the modulation method, the reception data based on the second reception signal Srx2.

Figure 2:
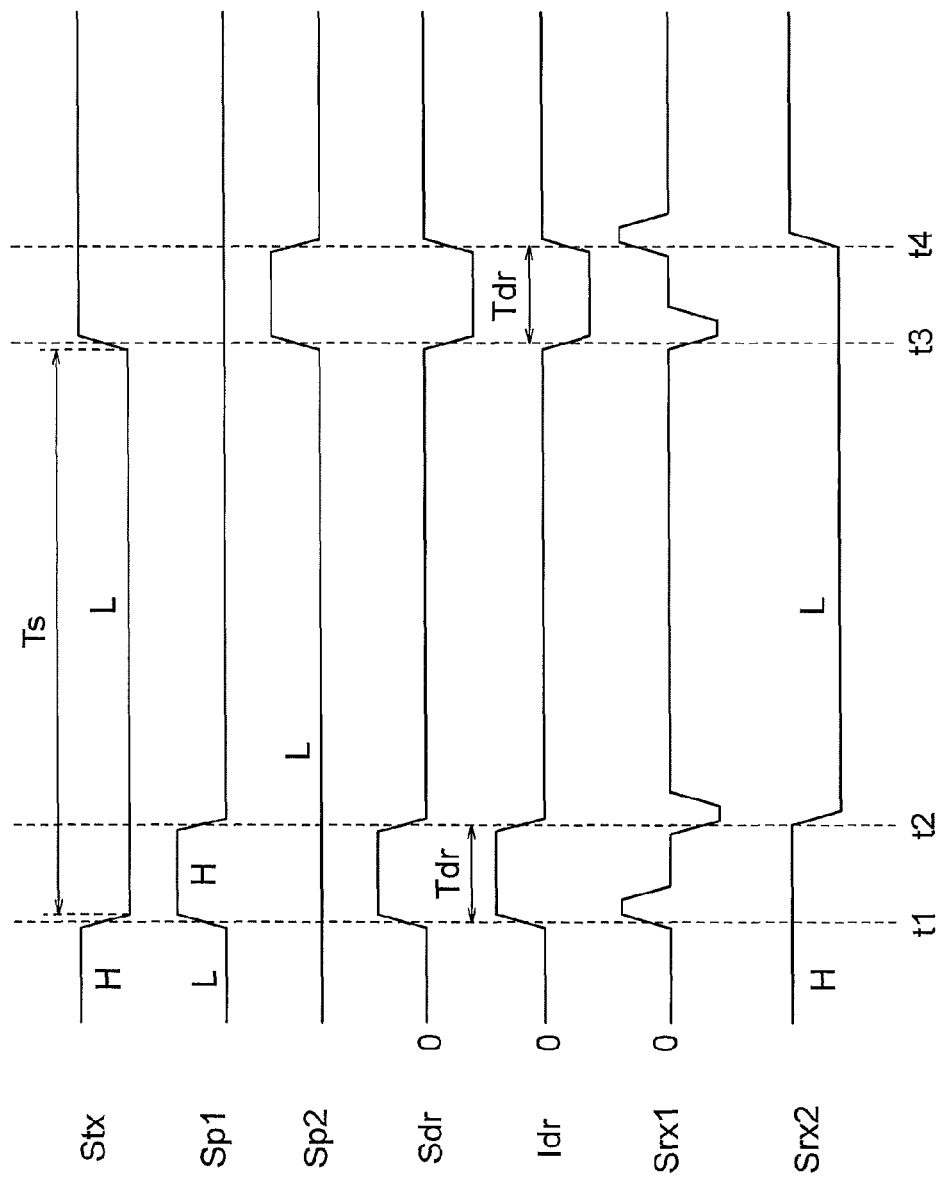
FIG. 2 is a timing chart of the communication system of FIG. 1.

FIG. 2 is a timing chart of the communication system 1 of FIG. 1. In an example illustrated in FIG. 2, the transmission signal Stx changes from "H" to "L" at time t1 and changes from "L" to "H" at time t3.

The drive signal generation circuit 12 generates, as an internal signal, a pulse signal Sp1 which becomes "H" during the driving period Tdr in synchronization with the falling edge of the transmission signal Stx at time t1. The pulse signal Sp1 becomes "H" during the period from time t1 to t2.

The drive signal generation circuit 12 generates, in response to the pulse signal Sp1, the drive signal Sdr which becomes a predetermined positive voltage during the period from time t1 to t2.

Thus, the positive drive current Idr flows through the transmission inductor L1 during the driving period Tdr from time t1 to t2.

Therefore, as the first reception signal Srx1, a positive pulse is generated at time t1, and a negative pulse is generated at time t2.

Thus, the second reception signal Srx2 which is "H" before time t1 does not change at time t1, and changes to "L" at time t2.

For example, when the communication is started from time t1, a logic of an initial value of the transmission signal Stx at the start of communication is "L", and a logic of the second reception signal Srx2 is set to "H" during standby until time t1. Thus, it is possible to receive the initial value "L" of the transmission signal Stx. In other words, the logic of the second reception signal Srx2 during the standby is different from the logic of the initial value of the transmission signal Stx.

On the other hand, when the logic of the initial value of the transmission signal Stx is "L" and the logic of the second reception signal Srx2 during the standby until time t1 is "L", that is, when these logics are the same, the second reception signal Srx2 becomes "H" at time t1 and becomes "L" at time t2. Therefore, "H" which is different from the initial value "L" of the transmission signal Stx is received, and it makes erroneous reception.

During the period from time t2 to t3, the drive signal Sdr is 0 V, and the drive current Idr is also 0 A. Therefore, the first reception signal Srx1 does not change, and the second reception signal Srx2 neither changes.

Next, at time t3, the drive signal generation circuit 12 generates, as an internal signal, a pulse signal Sp2 which becomes "H" during the driving period Tdr in synchronization with the rising edge of the transmission signal Stx at time t3. The pulse signal Sp2 becomes "H" during the period from time t3 to t4.

The drive signal generation circuit 12 generates, in response to the pulse signal Sp2, the drive signal Sdr which becomes a predetermined negative voltage during the period from time t3 to t4.

Thus, the negative drive current Idr flows through the transmission inductor L1 during the driving period Tdr from time t3 to t4. In other words, the drive circuit 13 makes the direction of the drive current Idr based on the rising edge of the transmission signal Stx opposite to the direction of the drive current Idr based on the falling edge of the transmission signal Stx.

Therefore, as the first reception signal Srx1, the negative pulse is generated at time t3, and the positive pulse is generated at time t4.

Thus, the second reception signal Srx2 which is "L" after time t2 does not change at time t3, and changes to "H" at time t4. That is, the hysteresis circuit 22 changes the logic of the second reception signal Srx2 in synchronization with the timing when the drive current Idr changes to zero.

In this manner, in the reception circuit 21, it is possible to obtain the second reception signal Srx2 equivalent to the transmission signal Stx.

Furthermore, the driving period Tdr is shorter than the minimum period of a signal level holding period Ts of the transmission signal Stx. The signal level holding period Ts represents the period where the signal level ("H" or "L") is fixed. Therefore, in the signal level holding period Ts of the transmission signal Stx, the drive current Idr does not flow during the period other than the driving period Tdr (for example, from time t2 to t3). Therefore, it is possible to reduce the power consumption of the transmission circuit 11.

Here, a communication system of a comparative example will be described. In the communication system of the comparative example, the basic configuration is similar to FIG. 1, but the function of the drive signal generation circuit 12 is different.

Figure 3:
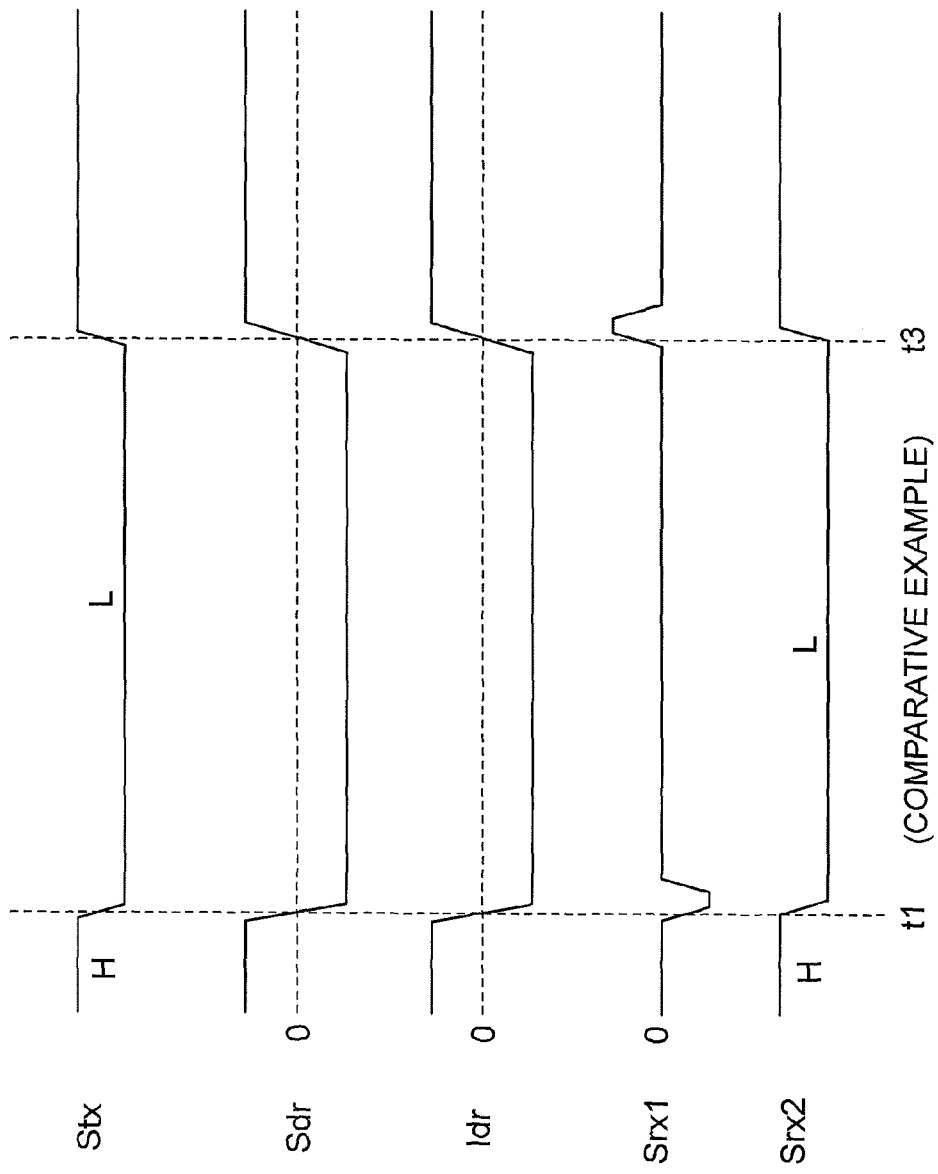
FIG. 3 is a timing chart of a communication system of a comparative example.

FIG. 3 is a timing chart of the communication system of the comparative example. In FIGS. 2 and 3, the transmission signal Stx is the same signal.

The drive signal Sdr becomes a predetermined positive voltage until time t1 where the transmission signal Stx is "H", and becomes a predetermined negative voltage during the period from time t1 to t3 where the transmission signal Stx is "L", and becomes the predetermined positive voltage after time t3 where the transmission signal Stx is "H".

Thus, through the transmission inductor L1, the positive drive current Idr flows until time t1, the negative drive current Idr flows during the period from time t1 to t3, and the positive drive current Idr flows after time t3.

Therefore, as the first reception signal Srx1, the negative pulse is generated at time t1, and the positive pulse is generated at time t3.

Thus, the second reception signal Srx2 changes from "H" to "L" at time t1, and changes to "H" at time t3.

In this manner, in the communication system of the comparative example, it is possible to obtain the second reception signal Srx2 equivalent to the transmission signal Stx. However, the positive or negative drive current Idr continuously flows through the transmission inductor L1. Therefore, in the communication system of the comparative example, the power consumption is larger in comparison with the first embodiment.

Incidentally, in the communication system 1 of the first embodiment, the communication system is not particularly limited. For example, the transmission signal Stx may be an asynchronous pulse width modulation (PWM) signal, an asynchronous trigger signal, or a non return to zero (NRZ) signal in the synchronous communication system. When the transmission signal Stx having a long period of "H" or "L" is transmitted, the reduction effect on the power consumption is improved. In other words, since the drive current Idr flows in synchronization with the rising edge and the falling edge of the transmission signal Stx during the driving period Tdr, the period where the drive current Idr does not flow is relatively long in the case of the transmission signal Stx having the long period of "H" or the like. On the other hand, in the case of the transmission signal Stx having a short period of "H" or the like, the drive current Idr frequently flows, and the period where the drive current Idr does not flow is relatively short.

Note that, when the synchronous communication system is used, the clock-data-recovery technique may be used and a clock signal transmission path to transmit a clock signal for synchronization may be added between the transmitter 10 and the receiver 20. The clock signal transmission path may be configured with the AC coupling or with a cable.

Next, as an example, the communication system 1 using the PWM signal will be described with reference to FIGS. 4 and 5.

Figure 4:
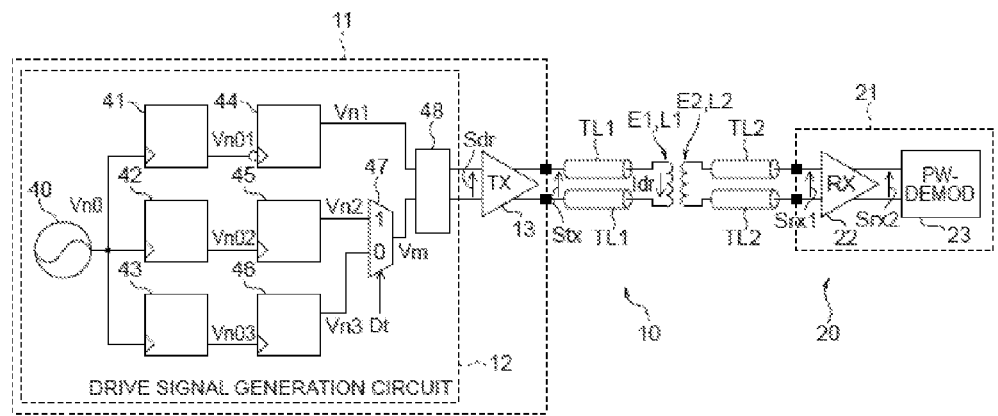
FIG. 4 is a block diagram illustrating a schematic configuration of the communication system 1 of FIG. 1 using a PWM signal.

FIG. 4 is a block diagram illustrating a schematic configuration of the communication system 1 of FIG. 1 using the PWM signal. As illustrated in FIG. 4, the drive signal generation circuit 12 includes a clock signal generator 40, first reference signal generators 41 and 42, a second reference signal generator 43, a first pulse generator 44, a second pulse generator 45, a third pulse generator 46, a multiplexer (selection circuit) 47, and a signal combining circuit 48.

Figure 5:
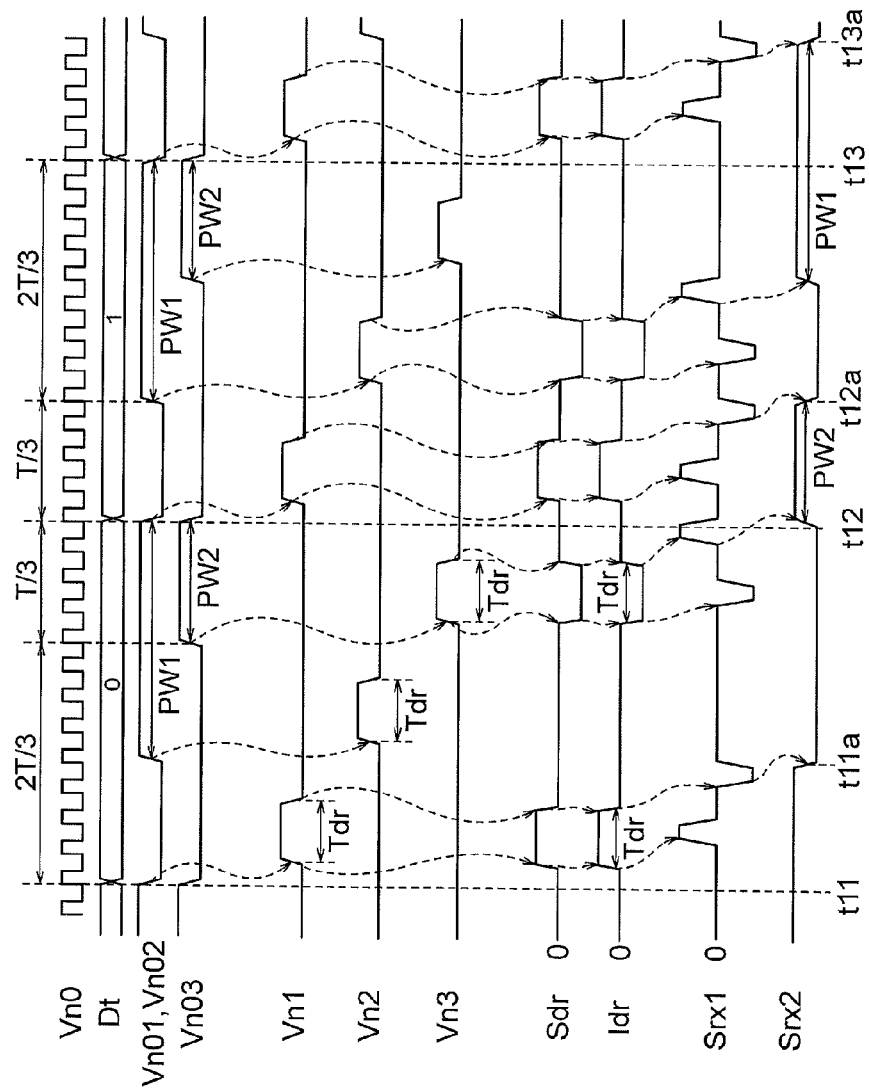
FIG. 5 is a timing chart of the communication system 1 of FIG. 4.

FIG. 5 is a timing chart of the communication system 1 of FIG. 4. As illustrated in FIG. 5, it is assumed that a 1-bit length of transmission data Dt to be submitted is T (seconds).

The clock signal generator 40 generates a clock signal Vn0. As an example, it is assumed that a cycle of the clock signal Vn0 is T/12.

The first reference signal generators 41 and 42 generate, in synchronization with the clock signal Vn0, first reference signals Vn01 and Vn02 corresponding to a first logic "1" of the transmission data Dt to be transmitted. The first reference signals Vn01 and Vn02 repeatedly include a pulse having a first pulse width PW1 in cycle T. Here, the first pulse width PW1 is 2T/3. In other words, the first reference signals Vn01 and Vn02 are "L" during the period of T/3 from time t11 and then becomes "H" during the period of 2T/3. One of the first reference signal generators 41 and 42 may be provided.

The second reference signal generator 43 generates, in synchronization with the clock signal Vn0, a second reference signal Vn03 corresponding to a second logic "0" of the transmission data Dt. The second reference signal Vn03 repeatedly includes a pulse having a second pulse width PW2 in cycle T. The second pulse width PW2 is narrower than the first pulse width PW1 and is T/3 here. In other words, the second reference signal Vn03 is "L" during the period of 2T/3 from time t11 and then becomes "H" during the period of T/3.

The timing of the falling edge of the first reference signals Vn01 and Vn02 is equal to the timing of the falling edge of the second reference signal Vn03. The timing of the rising edge of the first reference signals Vn01 and Vn02 is different from the timing of the rising edge of the second reference signal Vn03.

The transmission signal Stx, which is not illustrated, is equal to the first reference signals Vn01 and Vn02 when the transmission data Dt is the first logic "1", and equal to the second reference signal Vn03 when the transmission data Dt is the second logic "0". In the example of FIG. 5, the transmission signal Stx is equal to the second reference signal Vn03 from time t11 to t12. The transmission signal Stx is equal to the first reference signals Vn01 and Vn02 from time t12 to t13. Therefore, the transmission signal Stx alternately repeats "L" and "H" in cycle T and becomes the PWM signal in which a period of "H" is different in one cycle T in response to the transmission data Dt. In other words, the transmission signal Stx is modulated so that the period of "H" is different in one cycle T in response to the transmission data Dt.

The first pulse generator 44 generates, in synchronization with the falling edge of the first reference signal Vn01 or the second reference signal Vn03, a first pulse signal Vn1 including a pulse having a pulse width Tdr corresponding to the driving period Tdr. In the illustrated example, the first pulse signal Vn1 is synchronized with the falling edge of the first reference signal Vn01.

The second pulse generator 45 generates, in synchronization with the rising edge of the first reference signal Vn02, a second pulse signal Vn2 including a pulse having the pulse width Tdr corresponding to the driving period Tdr.

The third pulse generator 46 generates, in synchronization with the rising edge of the second reference signal Vn03, a third pulse signal Vn3 including a pulse having the pulse width Tdr corresponding to the driving period Tdr.

The multiplexer 47 selects and outputs, in response to the transmission data Dt, either of the second pulse signal Vn2 or the third pulse signal Vn3. Here, the multiplexer 47 selects the second pulse signal Vn2 when the transmission data Dt is "1" and selects the third pulse signal Vn3 when the transmission data Dt is "0".

The signal combining circuit 48 combines the first pulse signal Vn1 with an output signal Vm of the multiplexer 47 and generates the drive signal Sdr. More specifically, the signal combining circuit 48 generates the drive signal Sdr which becomes the positive voltage in synchronization with the first pulse signal Vn1 and becomes the negative voltage in synchronization with the output signal Vm (the second pulse signal Vn2 or the third pulse signal Vn3) of the multiplexer 47.

Therefore, the drive current Idr flows through the inductor L1 in response to the drive signal Sdr. Similarly to FIG. 2, since the drive current Idr flows during the driving period Tdr, it is possible to reduce the power consumption.

Then, as the first reception signal Srx1, the positive pulse is generated in synchronization with the rising edge of the drive current Idr, and the negative pulse is generated in synchronization with the falling edge of the drive current Idr.

In this manner, it is possible to obtain the second reception signal Srx2 equivalent to the transmission signal Stx. That is, the second reception signal Srx2 from time t11a to t12a is equivalent to the second reference signal Vn03 from time t11 to t12. The second reception signal Srx2 from time t12a to t13a is equivalent to the first reference signals Vn01 and Vn02 from time t12 to t13. As described above, the transmission signal Stx is equal to the second reference signal Vn03 from time t11 to t12, and the transmission signal Stx is equal to the first reference signals Vn01 and Vn02 from time t12 to t13. Therefore, the second reception signal Srx2 is equivalent to the transmission signal Stx.

The demodulator 23 demodulates reception data based on the length of the period of "H" of the second reception signal Srx2. In other words, when the length of the period of "H" after the period of "L" of the second reception signal Srx2 is relatively long (about 2T/3), the demodulator 23 demodulates the logic "1" as the reception data. Alternatively, when the length of the period of "H" after the period of "L" of the second reception signal Srx2 is relatively short (about T/3), the demodulator 23 demodulates the logic "0" as the reception data. Therefore, it is possible to obtain the reception data equal to the transmission data Dt. The demodulator 23 may demodulate the reception data based on the length of the period of "L" of the second reception signal Srx2.

As described above, according to the present embodiment, the drive current Idr flows through the transmission inductor L1 in synchronization with the rising edge and the falling edge of the transmission signal Stx during the driving period Tdr. Thus, during the period where the transmission signal Stx does not change after the driving period Tdr has passed, it is possible to prevent the drive current Idr from flowing. Therefore, it is possible to reduce the power consumption of the transmission circuit 11.

Second Embodiment

In a second embodiment, a drive current Idr is gradually reduced.

Figure 6:
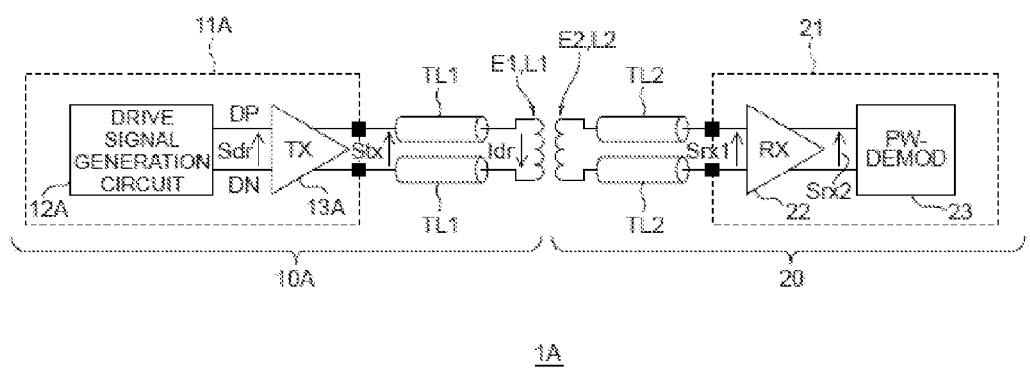
FIG. 6 is a block diagram illustrating a schematic configuration of a communication system according to a second embodiment.

FIG. 6 is a block diagram illustrating a schematic configuration of a communication system 1A according to the second embodiment. In FIG. 6, the same reference sign is assigned to a configuration part common to FIG. 1, and different parts will be mainly described below.

In the communication system 1A, a function of a transmission circuit 11A of a transmitter 10A is different from that of the first embodiment. A drive signal generation circuit 12A generates a drive signal Sdr in synchronization with a transmission signal Stx to be transmitted. The drive signal Sdr is a differential signal between a non-inverted drive signal DP and an inverted drive signal DN.

A drive circuit 13A causes, in response to the drive signal Sdr, the drive current Idr to flow through the transmission inductor L1 in synchronization with a rising edge and a falling edge of the transmission signal Stx and then reduces the drive current Idr with the lapse of time.

Figure 7:
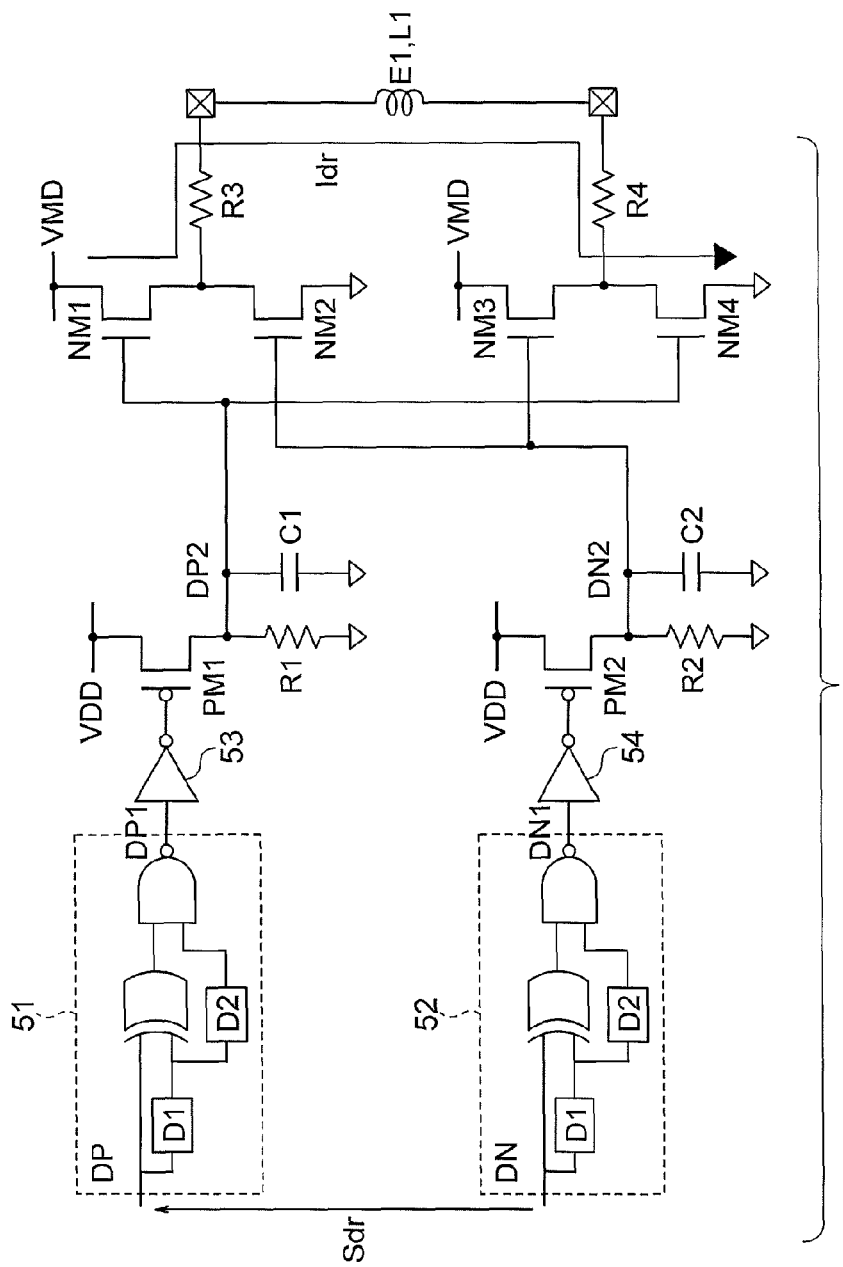
FIG. 7 is a block diagram illustrating a schematic configuration of a drive circuit of the communication system of FIG. 6.

FIG. 7 is a block diagram illustrating a schematic configuration of the drive circuit 13A of the communication system 1A of FIG. 6. As illustrated in FIG. 7, the drive circuit 13A includes a pulse generator (first pulse generator) 51, a pulse generator (second pulse generator) 52, inverters 53 and 54, a PMOS transistor (first PMOS transistor) PM1, a PMOS transistor (second PMOS transistor) PM2, a resistor (first resistor) R1, a resistor (second resistor) R2, resistors R3 and R4, a capacitor (first capacitor) C1, a capacitor (second capacitor) C2, an NMOS transistor (first NMOS transistor) NM1, an NMOS transistor (second NMOS transistor) NM2, an NMOS transistor (third NMOS transistor) NM3, and an NMOS transistor (fourth NMOS transistor) NM4.

The pulse generator 51 generates a signal (first signal) DP1 including a pulse synchronized with the rising edge of the non-inverted drive signal DP (the rising edge of the transmission signal Stx. The pulse generator 52 generates a signal (second signal) DN1 including a pulse synchronized with the rising edge of the inverted drive signal DN (the falling edge of the transmission signal Stx.

The inverter 53 inverts the signal DP1 and supplies the inverted signal to a gate of the PMOS transistor PM1. The PMOS transistor PM1 is turned ON or OFF in response to the signal DP1. The inverter 54 inverts the signal DN1 and supplies the inverted signal to a gate of the PMOS transistor PM2. The PMOS transistor PM2 is turned ON or OFF in response to a signal DP2.

A power supply voltage VDD is supplied to a source of the PMOS transistor PM1, and a drain of the PMOS transistor PM1 is connected to one end of the resistor R1, one end of the capacitor C1, and gates of the NMOS transistors NM1 and NM4. The other end of the resistor R1 and the other end of the capacitor C1 are grounded. It is assumed that the drain signal of the PMOS transistor PM1 is a signal DP2.

The power supply voltage VDD is supplied to the source of the PMOS transistor PM2, and the drain of the PMOS transistor PM2 is connected to one end of the resistor R2, one end of the capacitor C2, and the gates of the NMOS transistors NM2 and NM3. The other end of the resistor R2 and the other end of the capacitor C2 are grounded. It is assumed that a drain signal of the PMOS transistor PM2 is the signal DN2.

A drive voltage VMD is supplied to a drain of the NMOS transistor NM1, and a source of the NMOS transistor NM1 is connected to a drain of the NMOS transistor NM2 and one end of the resistor R3. A source of the NMOS transistor NM2 is grounded.

The drive voltage VMD is supplied to a drain of the NMOS transistor NM3, and a source of the NMOS transistor NM3 is connected to a drain of the NMOS transistor NM4 and one end of the resistor R4. A source of the NMOS transistor NM4 is grounded.

The other end of the resistor R3 is connected to one end of the transmission inductor L1 through a first transmission line TL1, which is not illustrated. The other end of the resistor R4 is connected to the other end of the transmission inductor L1 through the first transmission line TL1, which is not illustrated.

Figure 8:
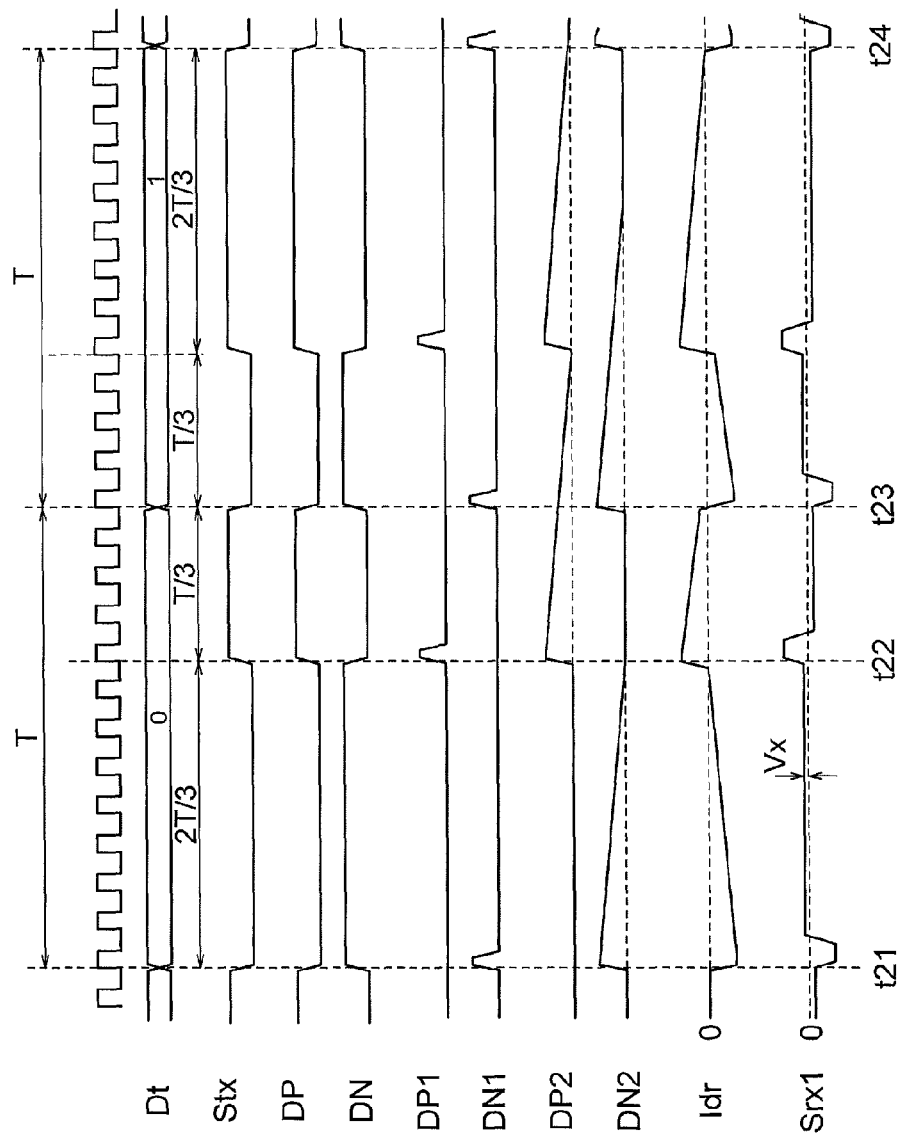
FIG. 8 is a timing chart of the communication system of FIG. 6.

FIG. 8 is a timing chart of the communication system 1A of FIG. 6. In FIG. 8, an example using a PWM signal will be described, but the communication system is not limited to this as described in the first embodiment.

The transmission signal Stx corresponds to a second logic "0" of transmission data Dt from time t21 to t23, and corresponds to a first logic "1" of the transmission data Dt from time t23 to t24.

The non-inverted drive signal DP is a signal having the same logic as the transmission signal Stx. The inverted drive signal DN is a signal obtained by inverting the non-inverted drive signal DP.

At time t21, a pulse of the signal DN1 is generated in synchronization with the rising edge of the inverted drive signal DN, and the PMOS transistor PM2 becomes conductive in response to the pulse. Thus, the signal DN2 rises from "L" to "H". On the other hand, the signal DP2 maintains "L".

Therefore, the NMOS transistors NM2 and NM3 become conductive, and the NMOS transistors NM1 and NM4 maintain non-conductive. Thus, the negative drive current Idr flows through the transmission inductor L1 from the resistor R4 side to the resistor R3 side.

Then, there is no pulse of the signal DN1, and the PMOS transistor PM2 becomes non-conductive. However, the signal DN2 gradually decreases by a time constant of the resistor R2 and the capacitor C2.

Therefore, the absolute value of the drive current Idr reaches the maximum value after time t21, and then decreases with the lapse of time. Thus, the power consumption of the transmission circuit 11A can be reduced more than the above described comparative example.

In a first reception signal Srx1, after the negative pulse is generated at time t21, the drive current Idr decreases, and thereby a substantially constant positive voltage Vx is generated. With the voltage Vx, a signal-to-noise ratio is deteriorated in comparison with the first embodiment.

At time t22, a pulse of the signal DP1 is generated in synchronization with the rising edge of the non-inverted drive signal DP, and the PMOS transistor PM1 becomes conductive in response to the pulse. Thus, the signal DP2 rises from "L" to "H". On the other hand, the signal DN2 falls to "L".

Therefore, the NMOS transistors NM1 and NM4 become conductive, and the NMOS transistors NM2 and NM3 become non-conductive. Thus, the positive drive current Idr flows through the transmission inductor L1 from the resistor R3 side to the resistor R4 side. In other words, the drive circuit 13A makes the direction of the drive current Idr based on the rising edge of the transmission signal Stx opposite to the direction of the drive current Idr based on the falling edge of the transmission signal Stx.

Then, there is no pulse of the signal DP1, and the PMOS transistor PM1 is turned OFF. However, the signal DP2 gradually decreases by a time constant of the resistor R1 and the capacitor C1.

Therefore, the drive current Idr reaches the maximum value after time t22, and then decreases with the lapse of time.

Thus, in the first reception signal Srx1, after the positive pulse is generated at time t22, a substantially constant negative voltage Vx is generated.

A second reception signal Srx2, which is not illustrated, changes to "L" at time t21, and changes to "H" at time t22.

The operations after time t23 are similar to the above.

In this manner, it is possible to obtain the second reception signal Srx2 equivalent to the transmission signal Stx.

As described above, according to the present embodiment, the drive current Idr flows through the transmission inductor L1 in synchronization with the rising edge and the falling edge of the transmission signal Stx, and then the drive current Idr is reduced with the lapse of time. Thus, it is possible to reduce the drive current Idr during the period where the transmission signal Stx does not change. Therefore, it is possible to reduce the power consumption of the transmission circuit 11A.

Third Embodiment

A third embodiment is different from the first embodiment in using capacitive coupling as the AC coupling.

Figure 9:
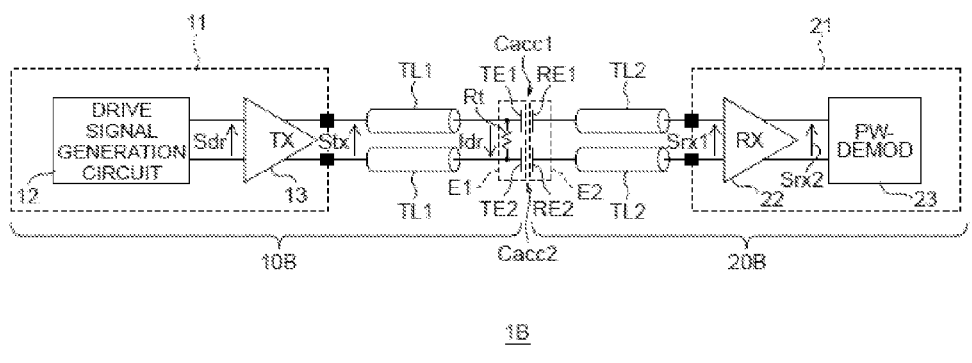
FIG. 9 is a block diagram illustrating a schematic configuration of a communication system according to a third embodiment.

FIG. 9 is a block diagram illustrating a schematic configuration of a communication system 1B according to the third embodiment. In FIG. 9, the same reference sign is assigned to a configuration part common to FIG. 1, and different parts will be mainly described below.

A transmitting AC coupling element E1 includes a first transmitting electrode TE1, a second transmitting electrode TE2, and a termination resistor Rt connected between the first transmitting electrode TE1 and the second transmitting electrode TE2. The first transmitting electrode TE1 and the second transmitting electrode TE2 are, for example, thin-filmy metallic patterns having an arbitrary shape, such as a circle, an oval, or a rectangle in plan view, and provided on a printed wiring board of a transmitter 10B.

One first transmission line TL1 connects a transmission circuit 11 and the first transmitting electrode TE1. The other first transmission line TL1 connects the transmission circuit 11 and the second transmitting electrode TE2.

With the termination resistor Rt, it is possible to suppress signal reflection from a receiver 20B to the transmitter 10B.

Similarly to the first embodiment, a drive circuit 13 causes, in response to a drive signal Sdr, a drive current Idr to flow through the transmitting AC coupling element E1 in synchronization with a rising edge and a falling edge of a transmission signal Stx during a driving period Tdr. The drive current Idr flows through the termination resistor Rt.

The receiving AC coupling element E2 includes a first receiving electrode RE1 and a second receiving electrode RE2. The first receiving electrode RE1 and the second receiving electrode RE2 are, for example, thin-filmy metallic patterns having an arbitrary shape, such as a circle, an oval, or a rectangle in plan view, and provided on a printed wiring board of the receiver 20B.

One second transmission line TL2 connects the first receiving electrode RE1 and a reception circuit 21. The other second transmission line TL2 connects the second receiving electrode RE2 and the reception circuit 21.

The transmitter 10B and the receiver 20B are adjacently arranged so that the first transmitting electrode TE1 is adjacent to the first receiving electrode RE1 and the second transmitting electrode TE2 is adjacent to the second receiving electrode RE2 when the communication is performed. The distances between the first transmitting electrode TE1 and the first receiving electrode RE1, and between the second transmitting electrode TE2 and the second receiving electrode RE2 are, for example, several mm. With this arrangement, the first transmitting electrode TE1 is capacitively coupled (AC coupled) to the first receiving electrode RE1, and the second transmitting electrode TE2 is capacitively coupled to the second receiving electrode RE2. A coupling capacitance Cacc1 between the first transmitting electrode TE1 and the first receiving electrode RE1, and a coupling capacitance Cacc2 between the second transmitting electrode TE2 and the second receiving electrode RE2 are, for example, several hundreds fF to several pF. Thus, the signal is transmitted from the first transmitting electrode TE1 and the second transmitting electrode TE2 to the first receiving electrode RE1 and the second receiving electrode RE2 through the coupling capacitances Cacc1 and Cacc2.

In this communication system 1B, it is possible to perform the communication similarly to the first embodiment.

In the present embodiment, since the drive current Idr can flow in synchronization with the rising edge and the falling edge of the transmission signal Stx during the driving period Tdr, it is possible to obtain the effect similar to the first embodiment.

Note that, in the second embodiment, the capacitive coupling may be used as the AC coupling similarly to the present embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A communication system comprising:
a transmitting alternating current (AC) coupling element;
a transmission circuit configured to transmit a transmission signal through the transmitting AC coupling element;
a receiving AC coupling element to be AC coupled to the transmitting AC coupling element; and
a reception circuit configured to receive a first reception signal through the receiving AC coupling element, wherein
the transmission circuit comprises:
a drive signal generation circuit configured to generate a drive signal in synchronization with the transmission signal to be transmitted; and
a drive circuit configured to cause, in response to the drive signal, a drive current to flow through the transmitting AC coupling element in synchronization with a rising edge and a falling edge of the transmission signal during a driving period set in advance,
the reception circuit comprises a hysteresis circuit having hysteresis characteristics and configured to output a second reception signal in response to the first reception signal received by the receiving AC coupling element, and
a logic of the second reception signal during standby is different from a logic of an initial value of the transmission signal.

2. The communication system according to claim 1, wherein
the receiving AC coupling element is a reception inductor, and
the transmitting AC coupling element is a transmission inductor to be inductively coupled to the reception inductor.

3. The communication system according to claim 1, wherein the receiving AC coupling element comprises:
a first receiving electrode; and
a second receiving electrode, and
the transmitting AC coupling element comprises:
a first transmitting electrode to be capacitively coupled to the first receiving electrode;
a second transmitting electrode to be capacitively coupled to the second receiving electrode; and
a termination resistor connected between the first transmitting electrode and the second transmitting electrode, and
the drive current flows through the termination resistor.

4. The communication system according to claim 1, wherein the drive circuit makes a direction of the drive current based on the rising edge of the transmission signal opposite to a direction of the drive current based on the falling edge.

5. The communication system according to claim 1, wherein the driving period is shorter than a minimum period of a signal level holding period of the transmission signal.

6. The communication system according to claim 1, wherein the drive signal generation circuit comprises:
a first reference signal generator configured to generate, in synchronization with a clock signal, a first reference signal corresponding to a first logic of transmission data to be transmitted, the first reference signal repeatedly comprising a pulse having a first pulse width;
a second reference signal generator configured to generate, in synchronization with the clock signal, a second reference signal corresponding to a second logic of the transmission data, the second reference signal repeatedly comprising a pulse having a second pulse width narrower than the first pulse width;
a first pulse generator configured to generate, in synchronization with a falling edge of the first reference signal or the second reference signal, a first pulse signal comprising a pulse having a pulse width corresponding to the driving period;
a second pulse generator configured to generate, in synchronization with a rising edge of the first reference signal, a second pulse signal comprising a pulse having a pulse width corresponding to the driving period;
a third pulse generator configured to generate, in synchronization with a rising edge of the second reference signal, a third pulse signal comprising a pulse having a pulse width corresponding to the driving period;
a selection circuit configured to select and output, in response to the transmission data, either of the second pulse signal or the third pulse signal; and
a signal combining circuit configured to combine the first pulse signal with the output of the selection circuit and generate the drive signal, and
the transmission signal is equal to the first reference signal when the transmission data is the first logic, and equal to the second reference signal when the transmission data is the second logic.

7. The communication system according to claim 6, wherein the reception circuit comprises a demodulator configured to demodulate reception data based on a length of a period of a high level or a low level of the second reception signal.

* * * * *